S. MANGOLD.
Milk-Boiler Alarms.
No. 139,072.	Patented May 20, 1873.
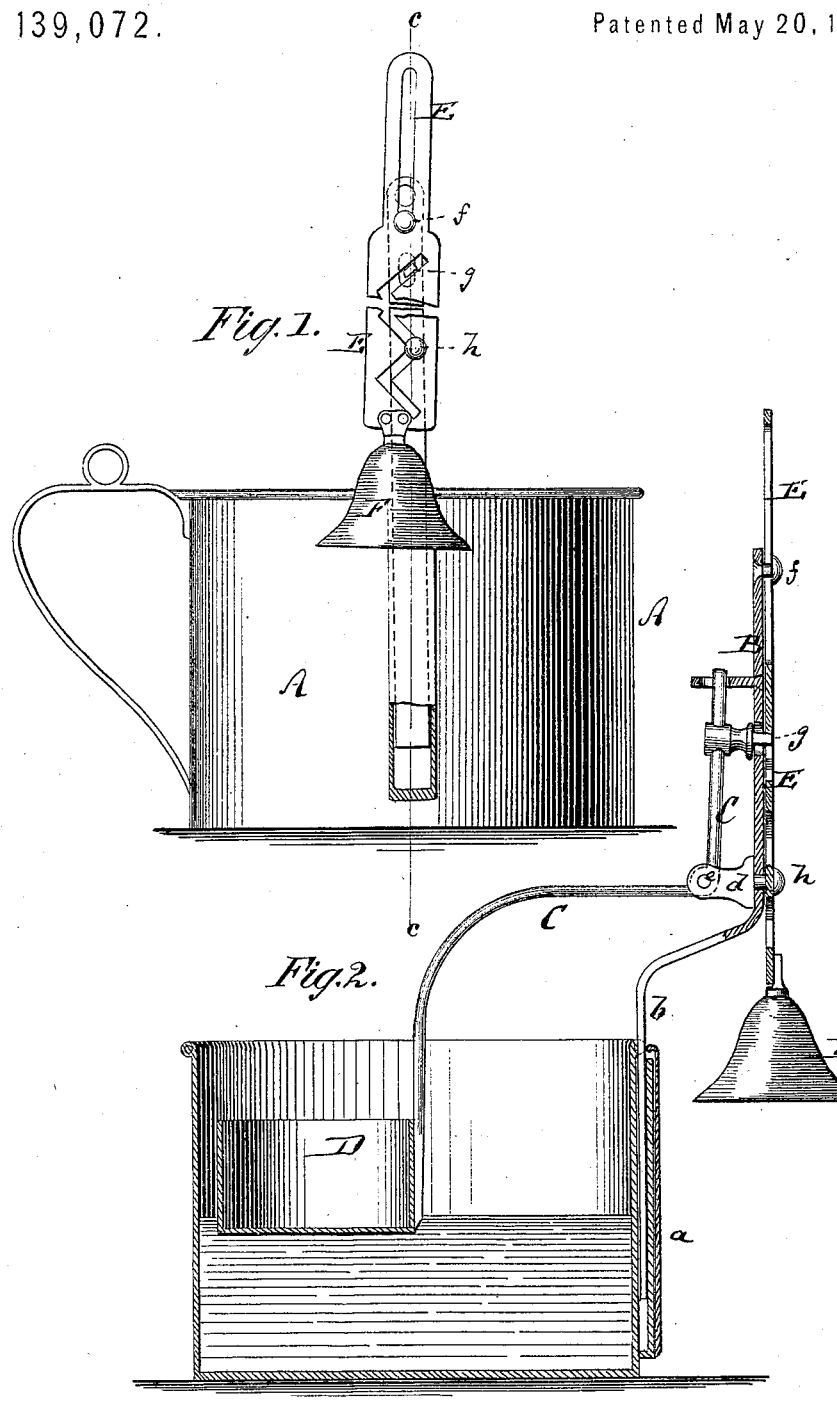

UNITED STATES PATENT OFFICE.

SAMUEL MANGOLD, OF NEW YORK, N. Y.

IMPROVEMENT IN MILK-BOILER ALARMS.

Specification forming part of Letters Patent No. 139,072, dated May 20, 1873; application filed December 14, 1872.

*To all whom it may concern:*

Be it known that I, SAMUEL MANGOLD, of New York city, in the county and State of New York, have invented a new and Improved Alarm Milk-Boiler, of which the following is a specification:

Figure 1 is a side elevation of my improved alarm milk-boiler. Fig. 2 is a vertical transverse section on the line C C, Fig. 1.

Similar letters of reference indicate corresponding parts.

The object of this invention is to prevent boiling milk from becoming spoilt by boiling over; and the invention consists in forming a milk-boiler alarm which, when the milk is about to boil over, will cause a bell to ring, so that the cook may be informed and remove the milk from the fire.

This invention is carried into effect by the use of a float, connecting with an elevated bell in such manner that, when the boiling milk rises to the top of the float and enters or weights it, the bell will be released and will drop, and, in dropping, ring and sound the alarm.

In the drawing, the letter A represents a vessel of suitable size, shape, and material, constituting a milk-boiler. At one side it is provided with a pocket, $a$, for the reception of the shank $b$ of the alarm attachment. This shank $b$ terminates on top in a bar or plate, B, which has a projecting ear, $d$, to which a wire or rod or arm, C, is pivoted at $e$. The lower part of this arm C carries a sort of dipper or small vessel, D, which can be suspended into the vessel A. E is a plate made with a zigzag slot, and carrying a bell, F, at its lower end, or at any other suitable part. This plate E is applied against the face of the plate B, and held thereto by a pin, $f$, that projects from B and passes through a straight slot in the upper part of said plate E, or vice versa. A pin, $g$, projecting from the upper part of the arm C, passes through a portion of the plate B into the zigzag slot of the plate E. Through the same zigzag slot passes also a pin, $h$, which projects from the face of B. When milk is poured into the vessel A, the vessel D is placed into it at such height as to float thereon, the shank $b$ being adjusted in the pocket $a$ to bring the vessel D to the proper height, according to the amount of milk in A. When the vessel D floats on the milk, the upper part of the arm C will incline toward the plate B, so that the pin $g$ will enter the zigzag slot of E. The plate E, being raised on B to its fullest extent, will be locked in the elevated position by the pin $g$, as then there will be the two pins $g$ $h$ entering the zigzag slot. When the milk begins to boil over it ascends to the brim of the vessel D and flows into the same, sinking it or swinging it down so as to withdraw the pin $g$ from the zigzag slot, whereupon the plate E, being released, will be drawn down by its weight and descend. This descent will be a sort of oscillating movement as the zigzag slot passes over the pin $h$, and the oscillations will cause the bell F to ring and to sound the necessary alarm.

Having thus described my invention, what I claim as new, and desire to secure by Letters Patent, is—

1. The bell F, applied to the plate E, having a zigzag slot, and serving as an alarm attachment to milk-boilers, as set forth.

2. The vessel D, applied to the pivoted arm C, which carries the pin $g$ to lock the slotted plate or shank E of the bell, as specified.

3. The combination of the adjustable shank $b$ and plate B with the pivoted arm C, vessel D, slotted plate E, and bell F, all arranged to operate substantially as herein shown and described.

SAMUEL MANGOLD.

Witnesses:
 A. V. BRIESEN,
 T. B. MOSHER.